US011360835B2

(12) United States Patent
Panda

(10) Patent No.: US 11,360,835 B2
(45) Date of Patent: Jun. 14, 2022

(54) METHOD AND SYSTEM FOR RECOMMENDER MODEL SELECTION

(71) Applicant: Tata Consultancy Services Limited, Mumbai (IN)

(72) Inventor: Prasanta Panda, Bhubaneswar (IN)

(73) Assignee: Tata Consultancy Services Limited, Mumbai (IN)

( * ) Notice: Subject to any disclaimer, the term of this patent is extended or adjusted under 35 U.S.C. 154(b) by 286 days.

(21) Appl. No.: 16/824,756

(22) Filed: Mar. 20, 2020

(65) Prior Publication Data

US 2021/0157664 A1 May 27, 2021

(30) Foreign Application Priority Data

Nov. 27, 2019 (IN) .............................. 201921048644

(51) Int. Cl.
| | | |
|---|---|---|
| G06F 11/00 | (2006.01) |
| G06F 11/07 | (2006.01) |
| G06N 20/00 | (2019.01) |
| G06N 3/08 | (2006.01) |

(52) U.S. Cl.
CPC ...... *G06F 11/0706* (2013.01); *G06F 11/0766* (2013.01); *G06N 3/08* (2013.01); *G06N 20/00* (2019.01)

(58) Field of Classification Search
CPC ... G06F 11/0706; G06F 11/0766; G06N 3/08; G06N 20/00; G06Q 30/0282; G06Q 30/1631
USPC ........................................................ 714/1–57
See application file for complete search history.

(56) References Cited

U.S. PATENT DOCUMENTS

| | | | |
|---|---|---|---|
| 9,535,938 B2 | 1/2017 | Somekh et al. | |
| 2006/0230306 A1* | 10/2006 | Richards | ............... G06F 11/076 |
| | | | 714/6.32 |
| 2010/0082708 A1* | 4/2010 | Kim | ...................... G06Q 10/06 |
| | | | 702/179 |
| 2015/0220336 A1* | 8/2015 | Kannan | ............... G06F 11/3452 |
| | | | 717/124 |
| 2017/0083377 A1* | 3/2017 | Muthuvaradharajan | ..................... |
| | | | G06F 11/0793 |
| 2018/0225391 A1 | 8/2018 | Sali et al. | |
| 2019/0175100 A1 | 6/2019 | Etleb et al. | |
| 2019/0228453 A1* | 7/2019 | Chapman | ........... G06Q 30/0255 |
| 2020/0159856 A1* | 5/2020 | Mital | ................... G06F 16/313 |

FOREIGN PATENT DOCUMENTS

| | | |
|---|---|---|
| CN | 105069140 A | 11/2015 |
| CN | 106600302 A | 4/2017 |
| WO | WO-2018/204410 A1 | 11/2018 |

* cited by examiner

*Primary Examiner* — Sarai E Butler
(74) *Attorney, Agent, or Firm* — Finnegan, Henderson, Farabow, Garrett & Dunner, LLP

(57) ABSTRACT

The disclosure herein generally relates to recommender model selection, and, more particularly, to a method and system for selecting a recommender model matching user requirements. The system collects a user requirement including at least one error measure and corresponding Error Value (EV) and Error Tolerance (ET) as input. A recommendation learned model processes the user requirement and selects at least one of a plurality of recommender models as a recommender model matching the user requirement and generates a recommendation.

9 Claims, 3 Drawing Sheets

METHOD AND SYSTEM FOR RECOMMENDER MODEL SELECTION

PRIORITY CLAIM

This U.S. patent application claims priority under 35 U.S.C. § 119 to: India Application No. 201921048644, filed on Nov. 27, 2019. The entire contents of the aforementioned application are incorporated herein by reference.

TECHNICAL FIELD

This disclosure relates generally to recommender model selection, and more particularly to a method and system for selecting a recommender model matching user requirements.

BACKGROUND

Recommender models are used for processing various types of data for generating recommendations. For example, targeted advertisements are generated with the intention of attracting customers towards purchasing goods. The targeted advertisements are generated by processing data such as purchase history of each customer, product/service specifications, offers, and so on. By processing such data, the recommender models extracts information pertaining to purchase interests of the user.

The inventors here have recognized several technical problems with such conventional systems, as explained below. Each of the recommender models may be having different data processing capabilities and in terms of type of data being processed by each of such recommender models. Each user may be having specific requirements while opting for recommender models, and selection of a recommender model that best matches the user requirements helps in obtaining optimum results.

SUMMARY

Embodiments of the present disclosure present technological improvements as solutions to one or more of the above-mentioned technical problems recognized by the inventors in conventional systems. For example, in one embodiment, a a processor implemented method for recommender model selection is provided. In this method, a user requirement is collected as input, via one or more hardware processors, wherein the user requirement comprises at least one error measure and corresponding at least one error value (EV) and error tolerance (ET). Further, the collected user requirement are processed using a recommendation learned model pre-trained on information pertaining to capability of a plurality of recommendation models and user requirements, via the one or more hardware processors. The recommendation learned model determines dynamically, value of EV and ET of the at least one error measure for each of the plurality of recommender models. The recommendation learned model further determines correlation between the determined value of EV and ET of the at least one error measure for each of the plurality of recommender models with the EV and ET in the user requirement, via the one or more hardware processors. Further, at least one of the plurality of recommender models is determined as a recommender model matching the user requirement, based on the determined correlation, via the one or more hardware processors. Further, a recommendation is generated based on the at least one recommender model determined as matching the user requirement, via the one or more hardware processors.

In another embodiment, a system for recommender model selection is provided. The system includes one or more hardware processors, one or more communication interfaces, and one or more memory storing a plurality of instructions. The plurality of instructions when executed cause the one or more hardware processors to collect a user requirement as input, via one or more hardware processors, wherein the user requirement comprises at least one error measure and corresponding at least one error value (EV) and error tolerance (ET). The system further processes the collected user requirement using a recommendation learned model pre-trained on information pertaining to capability of a plurality of recommendation models and user requirements, via the one or more hardware processors. The recommendation learned model determines dynamically, value of EV and ET of the at least one error measure for each of the plurality of recommender models. The recommendation learned model further determines correlation between the determined value of EV and ET of the at least one error measure for each of the plurality of recommender models with the EV and ET in the user requirement, via the one or more hardware processors. Further, at least one of the plurality of recommender models is determined as a recommender model matching the user requirement, based on the determined correlation, via the one or more hardware processors. Further, a recommendation is generated based on the at least one recommender model determined as matching the user requirement, via the one or more hardware processors.

In yet another embodiment, a non-transitory computer readable medium for recommender model selection is provided. The non-transitory computer readable medium executes the following method for generating a recommender model recommendation. In this method, a user requirement is collected as input, via one or more hardware processors, wherein the user requirement comprises at least one error measure and corresponding at least one error value (EV) and error tolerance (ET). Further, the collected user requirement are processed using a recommendation learned model pre-trained on information pertaining to capability of a plurality of recommendation models and user requirements, via the one or more hardware processors. The recommendation learned model determines dynamically, value of EV and ET of the at least one error measure for each of the plurality of recommender models. The recommendation learned model further determines correlation between the determined value of EV and ET of the at least one error measure for each of the plurality of recommender models with the EV and ET in the user requirement, via the one or more hardware processors. Further, at least one of the plurality of recommender models is determined as a recommender model matching the user requirement, based on the determined correlation, via the one or more hardware processors. Further, a recommendation is generated based on the at least one recommender model determined as matching the user requirement, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
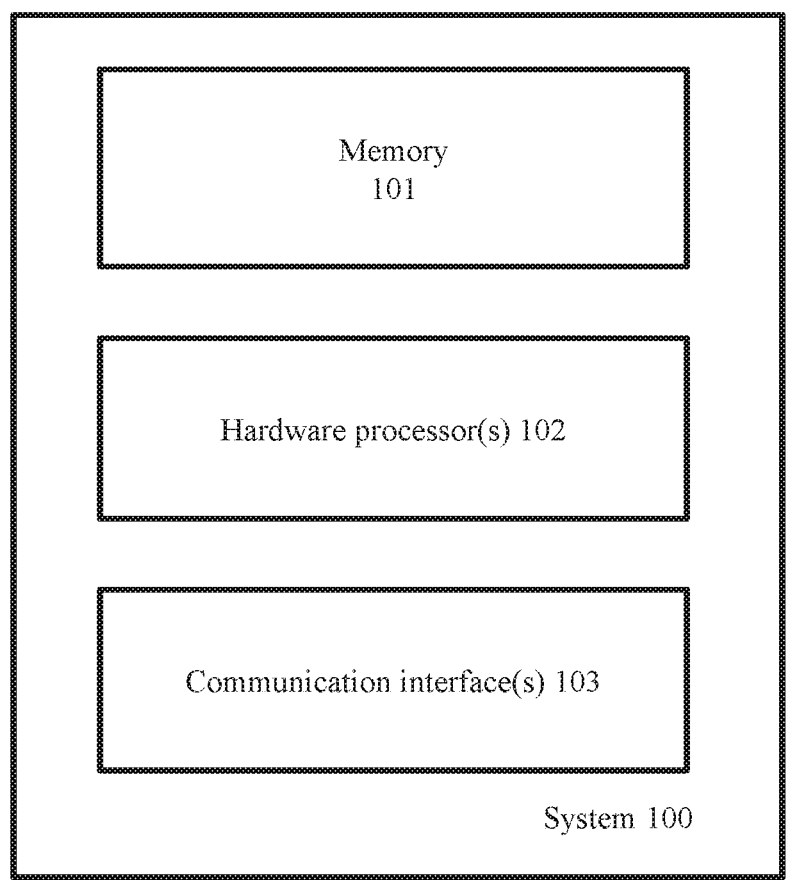
FIG. 1 illustrates an exemplary system for recommender model selection, according to some embodiments of the present disclosure.

FIG. 1 illustrates an exemplary system for recommender model selection, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) 102 are configured to fetch and execute computer-readable instructions stored in the memory 101, the instructions when executed cause the one or more hardware processors to perform one or more actions associated with the recommender model selection being handled by the system 100. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store operational instructions which when executed cause one or more of the hardware processor(s) 102 to perform various actions associated with the recommender model selection being handled by the system 100. The memory 101 further stores a recommendation learned model, which is used by the system 100 for generating the recommendations. The recommendation learned model is trained by using information pertaining to capability of a plurality of recommendation models and user requirements (user requirement) as training data. For example, the training data specifies user requirements, error measure(s) in each of the user requirements, corresponding EV and ET, specifications and capabilities of the plurality of recommender models, recommendations generated corresponding to each of the user requirements and so on. The recommendation learned model can be pre-trained using data of the aforementioned type. In another embodiment, the recommendation learned model can be updated using real-time data. The system 100 may use any suitable machine learning algorithm for generating the recommendation learned model using the training data. The recommendation learned model is configured to collect and process the input data from the user, and generate recommendation pertaining to one or more recommender models as matching a user requirements. The various steps involved in the process of recommender model selection are explained with description of FIG. 2 and FIG. 3. All the steps in FIG. 2 and FIG. 3 are explained with reference to the system of FIG. 1.

Figure 2:
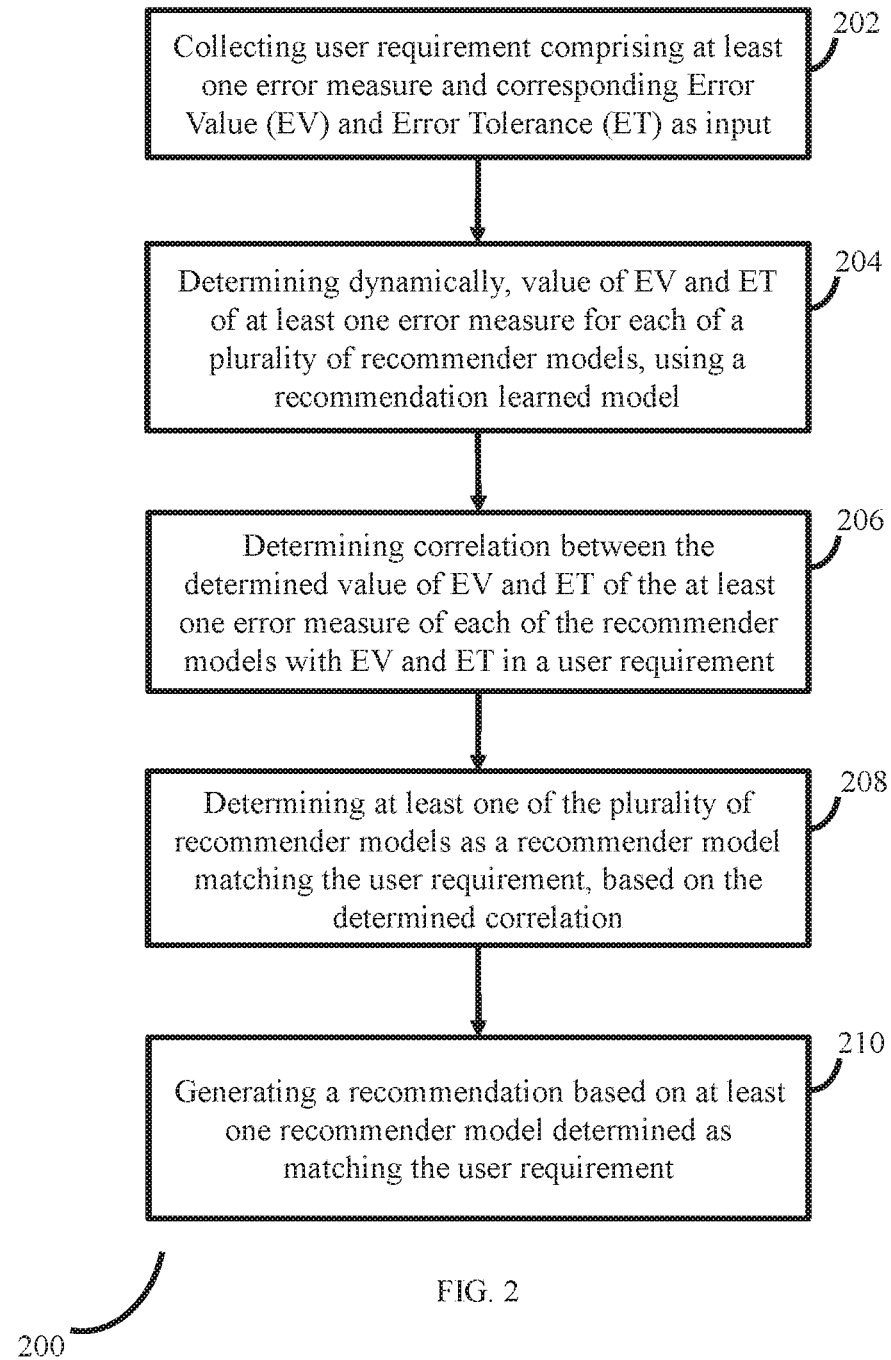
FIG. 2 is a flow diagram depicting steps involved in the process of generating a recommender model recommendation, using the system of FIG. 1, according to some embodiments of the present disclosure.
Figure 3:
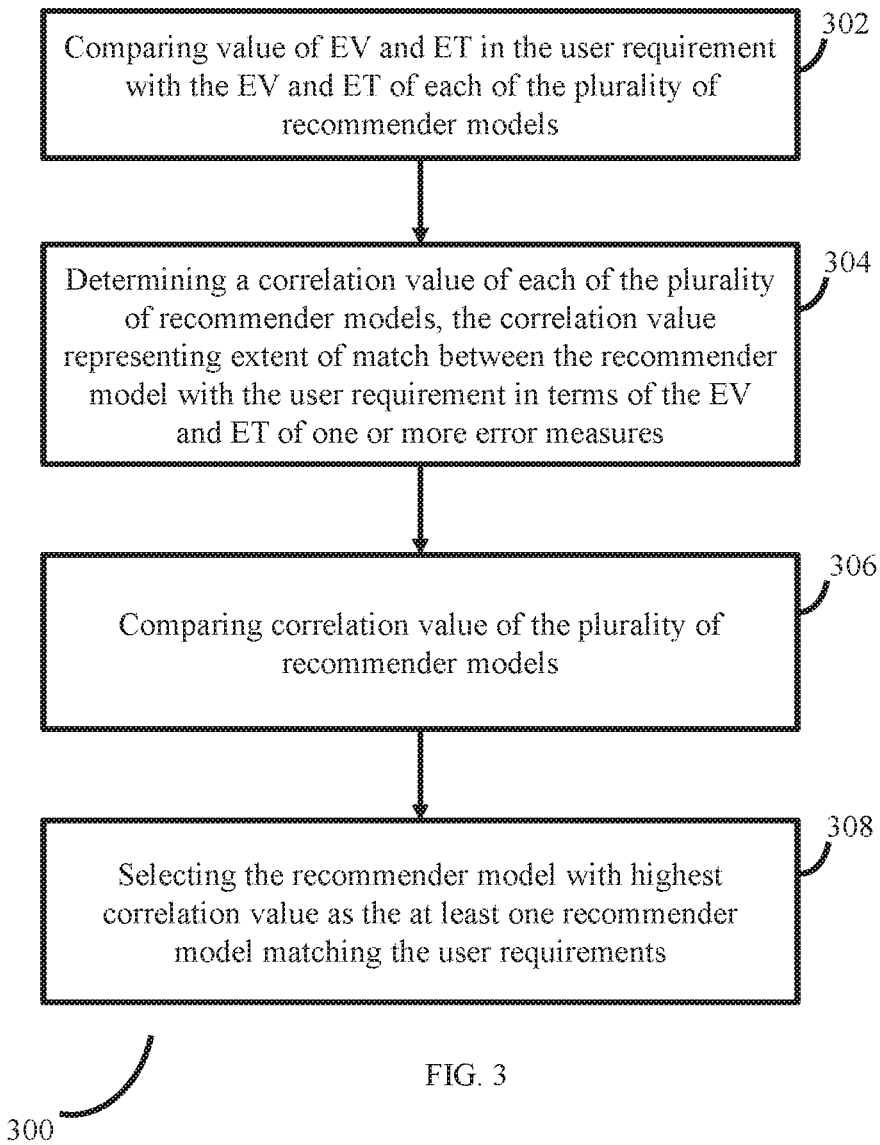
FIG. 3 is a flow diagram depicting steps involved in the process of selecting a recommender model from a plurality of recommender models, using the system of FIG. 1, in accordance with some embodiments of the present disclosure.

FIG. 2 is a flow diagram depicting steps involved in the process of generating a recommender model recommendation, using the system of FIG. 1, according to some embodiments of the present disclosure. The system 100 collects (202) a user requirements for at least one recommender model as input. The user requirements specify/include at least one error measure, and corresponding values of Error Value (EV) and Error Tolerance (ET). The term 'error measure' refers to parameters of the recommender model, values of which can indicate capability/performance of the recommender model. For example, the error measures are precision, recall, Root Mean Square Error (RMSE) and so on, and corresponding values. However due to various factors such as but not limited to training data used, and type(s) of ML algorithm used for generating the recommender model, there may be deviations in values of the error measures. The Error Value (EV) of any error measure represents a distinct value of the error measure, and ET represents extent of deviation from the distinct value, for each of the recommender models. Similarly in the user input, the error measures specified indicate type of parameters of the recommender model the user is interested in. Value of EV for an error measure in the user input represents value of the error measure the user expects, and value of ET represents extent of deviation the user is fine with (i.e. a user accepted deviation) in terms of specific values of the ET. For example, the user may specify value of an error measure 'efficiency' as 70% (i.e. EV), with an error tolerance value of ±5%. This means that the user is looking for a recommender model with at least 70% efficiency, and the ET of ±5% allows selection of recommender models having efficiency between 65% and 75%. In various embodiments, the recommender models are stored in the memory 101.

The collected user inputs are then fed as input to the recommendation learned model, which processes the user inputs to determine the user requirements in terms of the error measures, EV, and ET. The recommendation learned model further determines (204) values of EV and ET for at least the error measures specified in the user input, for each of the plurality of recommender models.

The recommendation learned model further determines (206) correlation between the determined values of EV and ET of at least the error measures specified in the user input with the corresponding values of EV and ET of the error measures of the recommender models. Here, the correlation is established by comparing the values of EV and ET of the error measures of the user input with that of the recommender models to find match. All the recommender models for which the EV and ET of at least the error measures specified in the user requirements matches the values of corresponding EV and ET are shortlisted. In this process, the recommendation learned model initially compares values of EV of an error measure of the recommender model with corresponding EV value specified in the user requirements. If the EV values are matching, then the recommender model is shortlisted. If the EV values are not matching, then the ET values are compared. If the extent of deviation is within the value of ET specified in the user requirements, then the recommender model is shortlisted. If the extent of deviation is not within the value of ET specified in the user requirements, then the recommender model is discarded. As the ET of each of the plurality of recommender models may be different, value of correlation value corresponding to each of the recommender models is determined. This step of determining the correlation value is explained in description of FIG. 3.

Based on the determined correlation, the system 100 determines (208) at least one of the recommender model as the recommender model matching the user requirements. The step 208 is explained further with description of FIG. 3. Further, the system 100 generates (210) a recommendation based on the at least one recommender model determined as matching the user requirements. In various embodiments, one or more steps in method 200 may be omitted. In another embodiment, steps in method 200 can be performed in the same order as depicted in FIG. 2 or in any alternate order technically feasible.

FIG. 3 is a flow diagram depicting steps involved in the process of selecting a recommender model from a plurality of recommender models, using the system of FIG. 1, in accordance with some embodiments of the present disclosure. While establishing the correlation, the values of EV and ET of one or more error measures of each of the recommender models are compared (302) with EV and ET of the same error measures of the user input, and determines (304) a correlation value of each of the recommender models, using equation 1. In an embodiment, the EV value may have preference over ET value. For example, if EV value of only one of the recommender models is matching the EV value in the user requirements, then the recommender model is determined as the recommender model matching the user requirements. If EV value of none of the recommender models is matching the EV value in the user requirements, only then the ET values and the corresponding correlation values are determined by the system 100. The correlation value of a recommender model represents extent of match between the recommender model and the user requirements.

$$error_j = \Sigma_{i=1}^{i=n} \sqrt{(actual_i - predicted_i)^2} \quad (1)$$

Where
$error_j \rightarrow$ Correlation value $actual_i \rightarrow$ represents value of ET specified in the user requirements $predicted_i \rightarrow$ represents determined value of ET of the recommender model After determining the correlation values, the system 100 compares (306) correlation value of each of the plurality of recommender models with one another, and selects (308) a recommender model with highest value of correlation value among the plurality of recommender models. In an embodiment, more than one recommender model are selected if the user input specifies so, and the more than one recommender models may be arranged based on the extent of deviation (and in turn extent of match with the user requirements). In various embodiments, one or more steps in method 300 may be omitted. In another embodiment, steps in method 300 can be performed in the same order as depicted in FIG. 3 or in any alternate order technically feasible.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for recommender model selection, comprising: collecting user requirements as input, via one or more hardware processors, wherein the user requirements comprise at least one error measure and corresponding at least one error value (EV) and error tolerance (ET); processing the collected user requirements using a recommendation learned model pre-trained on information pertaining to capability of a plurality of recommender models and user requirements, via the one or more hardware processors, wherein processing the collected user requirements comprising: determining dynamically, value of EV and ET of the at least one error measure for each of the plurality of recommender models; determining correlation between the determined value of EV and ET of the at least one error measure for each of the plurality of recommender models with the EV and ET in the user requirement, via the one or more hardware processors; determining at least one recommender model among the plurality of recommender models as a recommender model matching the user requirements, based on the determined correlation, via the one or more hardware processors; training a recommendation learned model by using information pertaining to capability of the plurality of recommender models and the user requirements as training data, wherein the recommendation learned model is updated using real time data and wherein the training data specifies the user requirements, corresponding EV and ET, specifications and capabilities of the plurality of recommender models via the one or more hardware processors; and generating a recommendation based on the at least one recommender model determined as matching the user requirements, via the one or more hardware processors.

2. The method as claimed in claim 1, wherein the EV and ET of the at least one error measure of the plurality of recommender models indicates capability of the recommender model.

3. The method as claimed in claim 1, wherein determining the at least one recommender model as the recommender model matching the user requirements based on the determined correlation comprises:
  comparing the EV and ET in the user requirements with EV and ET of each of the plurality of the recommender models;
  determining a correlation value of each of the plurality of recommender models, wherein the correlation value of a recommender model represents extent of match between the EV and ET of the recommender model with the EV and ET in the user requirement; and
  selecting at least one recommender model having highest correlation value among the plurality of recommender models as the at least one recommender model matching the user requirements.

4. A system for recommender model selection, comprising: one or more hardware processors; one or more communication interfaces; and one or more memory storing a plurality of instructions, wherein the plurality of instructions when executed cause the one or more hardware processors to: collect user requirements as input, via one or more hardware processors, wherein the user requirements comprise at least one error measure and corresponding at least one error value (EV) and error tolerance (ET); process the collected user requirements using a recommendation learned model pre-trained on information pertaining to capability of a plurality of recommender models and user requirements, via the one or more hardware processors, wherein processing the collected user requirements comprising: determining dynamically, value of EV and ET of the at least one error measure for each of the plurality of recommender models; determining correlation between the determined value of EV and ET of the at least one error measure for each of the plurality of recommender models with the EV and ET in the user requirements; determining at least one recommender model among the plurality of recommender models as a recommender model matching the user requirements, based on the determined correlation; train a recommendation learned model by using information pertaining to capability of the plurality of recommender models and the user requirements as training data, wherein the recommendation learned model is updated using real time data and wherein the training data specifies the user requirements, corresponding EV and ET, specifications and capabilities of the plurality of recommender models; and generate a recommendation based on the at least one recommender model determined as matching the user requirements.

5. The system as claimed in claim 4, wherein the EV and ET of the at least one error measure of the plurality of recommender models indicates capability of the recommendation model.

6. The system as claimed in claim 4, wherein the system determines the at least one recommender model as the recommender model matching the user requirements based on the determined correlation by:
  comparing the EV and ET in the user requirement with EV and ET of each of the plurality of the recommender models;
  determining a correlation value of each of the plurality of recommender models, wherein the correlation value of a recommender model represents extent of match between the EV and ET of the recommender model with the EV and ET in the user requirement; and
  selecting at least one recommender model having highest correlation value among the plurality of recommender models as the at least one recommender model matching the user requirements.

7. A non-transitory computer readable medium for recommender model selection, the non-transitory computer readable medium performs the recommender model selection by: collecting user requirements as input, via one or more hardware processors, wherein the user requirements comprise at least one error measure and corresponding at least one error value (EV) and error tolerance (ET); processing the collected user requirements using a recommendation learned model pre-trained on information pertaining to capability of a plurality of recommender models and user requirements, via the one or more hardware processors, wherein processing the collected user requirements comprising: determining dynamically, value of EV and ET of the at least one error measure for each of the plurality of recommender models; determining correlation between the determined value of EV and ET of the at least one error measure for each of the plurality of recommender models with the EV and ET in the user requirement, via the one or more hardware processors; and determining at least one recommender model among the plurality of recommender models as a recommender model matching the user requirements, based on the determined correlation, via the one or more hardware processors; training a recommendation learned model by using information pertaining to capability of the plurality of recommender models and the user requirements as training data, wherein the recommendation learned model is updated using real time data and wherein the training data specifies the user requirements, corresponding EV and ET, specifications and capabilities of the plurality of recommender models via the one or more hardware processors;

and generating a recommendation based on the at least one recommender model determined as matching the user requirements, via the one or more hardware processors.

8. The non-transitory computer readable medium as claimed in claim 7, wherein the EV and ET of the at least one error measure of the plurality of recommender models indicates capability of the recommender model.

9. The non-transitory computer readable medium as claimed in claim 7, wherein determining the at least one recommender model as the recommender model matching the user requirements based on the determined correlation comprises:
> comparing the EV and ET in the user requirements with EV and ET of each of the plurality of the recommender models;
> determining a correlation value of each of the plurality of recommender models, wherein the correlation value of a recommender model represents extent of match between the EV and ET of the recommender model with the EV and ET in the user requirement; and
> selecting at least one recommender model having highest correlation value among the plurality of recommender models as the at least one recommender model matching the user requirements.

* * * * *